United States Patent [19]
Bohannon et al.

[11] Patent Number: 5,845,292
[45] Date of Patent: Dec. 1, 1998

[54] SYSTEM AND METHOD FOR RESTORING A DISTRIBUTED CHECKPOINTED DATABASE

[75] Inventors: Philip L. Bohannon, Mt. Tabor, N.J.; James Allen Parker, Columbus, Ohio; Rajeev Rastogi, New Providence; Abraham Silberschatz, Summit, both of N.J.

[73] Assignee: Lucent Technologies Inc., Murray Hill, N.J.

[21] Appl. No.: 766,096

[22] Filed: Dec. 16, 1996

[51] Int. Cl.$^6$ ...................................................... G06F 17/30
[52] U.S. Cl. .............................. 707/202; 707/8; 707/200; 707/201; 395/182.13; 395/182.14; 395/182.17; 395/182.18
[58] Field of Search .............................. 707/8, 201, 202, 707/200, 182.13, 182.14, 182.17, 182.18; 395/182.13, 182.14, 182.17, 182.18

[56] References Cited

U.S. PATENT DOCUMENTS

| | | | |
|---|---|---|---|
| 5,465,328 | 11/1995 | Dievendorff | 395/182.13 |
| 5,469,562 | 11/1995 | Saether | 395/182.18 |
| 5,481,699 | 1/1996 | Saether | 395/182.18 |
| 5,592,661 | 1/1997 | Eisenberg | 707/104 |

*Primary Examiner*—Thomas G. Black
*Assistant Examiner*—Diane D. Mizrahi

[57] ABSTRACT

For use with a central database associated with a server of a network, the central database having distributed counterparts stored in volatile memories of clients of the network to allow operations to be performed locally thereon, the central database further having multiple checkpoints and a stable log stored in the server for tracking operations on the central database to allow corresponding operations to be made to the multiple checkpoints, the stable log having tails stored in the volatile memories to track operations on corresponding ones of the distributed counterparts, the distributed counterparts to corruption, a system for, and method of, restoring a distributed counterpart stored in one of the volatile memories. The system includes: (1) a checkpoint determination controller that determines which of the multiple checkpoints is a most recently completed checkpoint and copies the most recently completed checkpoint to the one of the volatile memories to serve as an unrevised database for reconstructing the distributed counterpart and (2) an operation application controller that retrieves selected ones of the operations from the stable log and a tail corresponding to the distributed counterpart and applies the operations to the unrevised database thereby to restore the distributed counterpart.

35 Claims, 6 Drawing Sheets

(PRIOR ART)

SYSTEM AND METHOD FOR RESTORING A DISTRIBUTED CHECKPOINTED DATABASE

CROSS-REFERENCE

The present invention is related to that disclosed in U.S. pending patent application Ser. No. 08/767,048, filed concurrently herewith on Dec. 16, 1996, entitled "SYSTEM AND METHOD FOR RESTORING A MULTIPLE CHECKPOINTED DATABASE IN VIEW OF LOSS OF VOLATILE MEMORY," which is commonly assigned with the present invention and incorporated herein by reference for all purposes.

TECHNICAL FIELD OF THE INVENTION

The present invention is directed, in general, to database management systems ("DBMs") and, more specifically, to a system and method for restoring a distributed database having multiple checkpoints after the database has been corrupted.

BACKGROUND OF THE INVENTION

A database is a collection of data organized usefully and fundamental to some software application (e.g., an information management system). The database is associated with a database manager ("DBM"), which itself is software-based and performs a range of tasks on the database, usually for the software application, the range of tasks varying largely upon the intended use of the database and the sophistication of the DBM.

Traditionally, databases have been stored in non-volatile (disk) memory, while DBMs and software applications have resided, at least in pertinent part, in volatile (main) memory. DBMs have been distinguished by the manner in which they process and manipulate the data with which they are charged. For example, some DBMs only manipulate one data file at a time (flat-file DBMs), others process multiple data files at one time, associating data from several different data files (relational DBMs).

Fundamental DBM operations include storing data, creating indexes that allow retrieval of data, linking data from different files (relational DBMs), etc. Two of the most important operations, and hence most sophisticated, performed by DBMs are data integrity and database recovery.

Data integrity, very simply, insures that one software application cannot modify a particular data file while another software application is relying upon the contents of the same. Database recovery, on the other hand, involves rebuilding the database after part or all of its data is corrupted—data corruption may be caused by a power outage, a program crash or the like that causes the DBM to suspect that at least part of the data stored therein has been lost or damaged.

Today, many software applications require high performance access to data with response time requirements on the order of a few to tens of milliseconds. Traditional non-volatile (disk) memory DBMs have been largely incapable of meeting the high performance needs of such applications (often due to the latency of accessing data that is non-volatile memory-resident).

In an effort to improve performance, one approach provides a large buffer (volatile memory-resident) for loading a portion of the database therein for faster access. A fundamental problem arises however when a conventional disk-based architecture is adopted to implement such a system. Most disk-based architectures have a buffer manager. Page requests result in searching the memory buffer to see if the requested page is already resident there. Thus, even if a page were cached in the memory buffer, access to data on the page requires locating the page and "pinning" it in the buffer. These transactions tend to substantially increase processing overhead.

Another approach maps the entire database directly into volatile (main) memory. The data may be accessed either directly by virtual memory pointers, or indirectly via location independent database offsets that quickly translate into memory addresses (therefore, no need for data requests to interact with a buffer manager, either for locating data, or for fetching/pinning buffer pages). Data access using a main-memory database is much faster than disk-based storage managers—pages need not be written to disk during normal processing to make space for other pages.

A significant danger exists however if a portion or all of the main memory database becomes corrupted then, unlike non-volatile (disk) memory databases, the entire database may need to be recovered.

This problem has been compounded in recent years. With the advent of extremely powerful workstations and personal computers and continue to experience impressive increases in storage capacities, the cost effectiveness of these systems combined with emerging high-speed network technologies have led to the development of high-performance data processing environments based on networks of workstations. There is a desire and, frankly, a need to distribute the above-described main-memory database systems over these networks.

Typical network environments consist of hundreds of workstations capable of communicating and storing upwards of tens of Giga-Bytes of memory resident data. The aggregate capacity and processing power of these network systems make available tremendous amounts of and underutilized memory space. This coupled with high bandwidth local area networks ("LANs") have made memory-to-memory communication much faster than memory-to-disk transfers rates.

Such massive high-performance memory systems are ideally suited for distributed main-memory database systems. However, conventional approaches, particularly recovery schemes for the same, are in efficient—data storage systems fail to fully utilizes the aggregate memory capacities of individual workstations. There exists a need in the art for means to guarantee high transaction throughput in a distributed main-memory database that minimizes disk accesses, insures data integrity and reliable recovery in the event a portion of the database becomes corrupted. More particularly, there is a need in the art is a recovery scheme that substantially reduces the duration of latches on pages during updates.

SUMMARY OF THE INVENTION

The present invention introduces the broad concept of providing a distributed database that may be revised quickly (because it is stored in separate volatile memories of various computer systems of a computer network), but that is recoverable should it (or any of the distributed counterparts) become corrupted (by virtue of being stored in the volatile memories). "Corrupted," as used herein, is defined as being damaged or, at an extreme, lost in its entirety. "Or," as used herein, is inclusive, meaning and/or.

The present invention provides, for use with a central database associated with a server of a computer network, the central database having distributed counterparts stored in volatile memories of clients of the computer network to allow operations to be performed locally thereon, the central database further having multiple checkpoints and a stable log stored in the server for tracking operations on the central database to allow corresponding operations to be made to the multiple checkpoints, the stable log having tails stored in the volatile memories to track operations on corresponding ones of the distributed counterparts, the distributed counterparts subject to corruption, a system for, and method of, restoring a distributed counterpart stored in one of the volatile memories. The system includes: (1) a checkpoint determination controller that determines which of the multiple checkpoints is a most recently completed checkpoint and copies the most recently completed checkpoint to the one of the volatile memories to serve as an unrevised database for reconstructing the distributed counterpart and (2) an operation application controller that retrieves selected ones of the operations from the stable log and a tail corresponding to the distributed counterpart and applies the operations to the unrevised database thereby to restore the distributed counterpart. "Include" and derivatives thereof, as used herein, means inclusion without limitation, and "controller," as used herein, may be suitably hardware-, firmware- or software-based, or may include suitable combinations of the same.

The present invention uniquely employs multiple checkpoints and a stable log (having a volatile tail) to accomplish the heretofore inconsistent characteristics of quick revision and reliable recoverability in a distributed main-memory database. According to an advantageous embodiment, the central database and the multiple checkpoints each contain an active transaction table, the checkpoint determination controller copying the active transaction table from the most recently completed checkpoint to the one of the volatile memories. In an embodiment to be illustrated and described, the active transaction table defines the state of transactions (correlating to revisions) that are to be made, are in the process of being made or have been made to the central database and the distributed counterparts. The active transaction table provides a guide to the operation application controller as to how to reconstruct the distributed counterpart that has become corrupted.

A "transaction" means any sequence of operations, and an "operation" means any sequence of actions at lower levels of abstraction than transactions—each operation typically having a level, Li, associated therewith such that an operation at Li may consist of a sequence of operations at a lower level, Li-1 (transactions, assumed to be at Ln, call operations at Level Ln-1 (commonly, physical updates to regions are Lo operations)). According to an advantageous embodiment, the applied operations include one or more log records at an operation level (representing at least one transaction) and the operation application controller, using memory locks while restoring the distributed counterpart that has become corrupted, releases ones of the memory locks as a function of applying ones of the log records, thereby achieving multi-level recovery. The present invention therefore allows the release of memory locks at the end of an operation (operation commit) rather than at the end of an transaction (transaction commit).

In another advantageous embodiment, the stable log and the tail cooperate to form a global log, the operation application controller applying the revisions as a function of a temporal pointer associated with the global log. The temporal pointer provides a high-resolution indication of which of the revisions had been applied to the unrevised database. In a related embodiment, the operation application controller retrieves revisions from the stable log and the tail that were not made to the most recently completed checkpoint.

In yet another embodiment, the distributed counterparts further have undo logs for tracking revisions to be undone in the active database, the operation application controller retrieving the selected ones of the revisions as a function of a content of the undo logs. In the embodiment to be illustrated and described, revisions to the distributed counterparts may be both done and undone. The undo log allows undoing of revisions (or transactions).

The foregoing has outlined, rather broadly, advantageous and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Before undertaking a detailed discussion of an exemplary embodiment of the present invention, it is advantageous to discuss a related patent document. The present invention is related to that disclosed in U.S. pending patent application Ser. No. 08/767,048 (Attorney Docket LUCT-109542 (the "'542 Application")), filed concurrently herewith on Dec. 16, 1996, entitled "SYSTEM AND METHOD FOR RESTORING A MULTIPLE CHECKPOINTED DATABASE IN VIEW OF LOSS OF VOLATILE MEMORY," which is commonly assigned with the present invention and incorporated herein by reference for all purposes.

The '542 Application introduces the broad concept of providing an active database stored in volatile memory that can be revised quickly, but that is recoverable should it become corrupted (possibly by virtue of being stored in the volatile memory). The '542 Application uniquely uses multiple checkpoints, a stable log (having a volatile tail) and multi-level transactions/operations to accomplish the heretofore inconsistent characteristics of quick revision and reliable recoverability.

According to an advantageous embodiment thereof, the active database and the multiple checkpoints each contain an active transaction table that may be copied from a most recently completed checkpoint to the volatile memory during recovery. The active transaction table may suitably define a state of transactions (correlating to revisions) that are to be made, are in the process of being made (precommit) or have been made (commit) to the active database. The active transaction table provides a guide to the operation application controller as to how to reconstruct the active database during recovery.

Each transaction consists of a sequence of operations. Each transaction advantageously obtains an operation lock before an operation executes (the lock is granted to the operation if it commutes with other operation locks held by active transactions), L0 operations advantageously obtaining region locks. The locks on the region are released once the L1 operation pre-commits; however, an operation lock at level Li is held until the transaction or the containing operation (at level Li+1) pre-commits. Thus, the locks acquired by a transaction are released once the same pre-commits.

The recovery algorithm of the '542 Application maintains separate undo and redo logs in memory for each transaction (the general concept of using logs in data processing is known). The logs are linked from an entry for the transaction in the active-transaction table. Each update (to a part of a region of the database) generates each of a physical undo and a redo log record that is respectively appended to the transaction's undo and redo logs. When a transaction/operation pre-commits, the redo log records for the transaction in its redo log are appended to a system log, and the logical undo description for the operation is included in the operation commit log record in the redo log. Thus, with the exception of logical undo descriptors, only redo records may be written to the system log during normal processing.

When an operation pre-commits, the undo log records for its suboperations/updates are deleted (from the transaction's undo log) and an undo log record containing the undo description for the operation is appended to the transaction's undo log. In-memory undo logs of transactions that have pre-committed are deleted since they are not required again. Locks acquired by an operation/transaction may be released once pre-committed.

The global log (the tail) is flushed to disk when a transaction decides to commit. According to the '542 Application, update actions do not obtain latches on pages—instead region locks ensure that updates do not interfere with each other. In addition, actions that are normally taken on page latching, such as setting of dirty bits for the page, may be performed based on log records written to the redo log. The redo log is used as a single unifying resource to coordinate the applications interaction with the recovery system.

As set forth hereinabove, traditional recovery schemes implement write-ahead logging (WAL), whereby undo logs for updates on a page are flushed to disk before the page is flushed to disk. To guarantee the WAL property, a latch on the page (or possibly on the system log) is held while copying the page to disk. According to the '542 Application, latches are eliminated on pages during updates, since latching can significantly increase access costs in volatile memory, can increase programming complexity and can interfere with normal processing—as a result, WAL may not be enforced, as since pages may be getting updated as being checkpointed.

In response, the '542 Application stores two copies of the database image, and alternate checkpoints write dirty pages to alternate copies ("ping-pong" checkpointing). Ping-pong checkpointing permits a checkpoint that is being created to be temporarily inconsistent (i.e., updates may have been written out without corresponding undo records having been written). However, after writing out dirty pages, sufficient redo and undo logs are written out to bring the checkpoint to a consistent state. Even if a failure occurs while creating one checkpoint, the other checkpoint is still consistent, and can be used for recovery.

In addition to permitting updates without latching, ping-pong checkpointing has several benefits; (1) it enables audits of data to be performed before the checkpoint is declared to be completed, which is very important in main-memory databases since the chance of data corruption is relatively high compared on atomic page writes (which is not supported on many input/output systems) for correctness. The only atomic action required is the toggling of a checkpoint anchor indicating the current checkpoint.

Advantageously, checkpoints write out dirty pages without obtaining latches and thus without interfering with normal operations ("fuzzy" checkpointing). Fuzzy checkpointing may be made possible because physical redo log records are generated by updates; these are used during restart recovery. For uncommitted updates whose effect has reached the checkpoint image, undo log records may be written out to disk after the database image has been written. This is performed by checkpointing the active transaction table after checkpointing the data; the checkpoint of the active transaction table writes out undo log records and possibly other status information.

At the end of checkpointing, a log flush may be performed thereby declaring the checkpoint completed (and consistent). This is the case because undo logs are deleted on transaction/operation pre-commit, which may occur before the checkpoint of the active transaction table. If the checkpoint completes, and the system then fails before a log flush, then the checkpoint may contain uncommitted updates for which there is no undo information. The log flush ensures that the transaction/operation has committed, and so the updates will not have to be undone.

In an advantageous embodiment, the checkpoint determines that a page is dirty, rather than setting a dirty bit during an update (which can result in a race condition with checkpointing the page since no latches are obtained), setting of the dirty bit using the log flushing process, which is coordinated with the checkpointing.

As part of the checkpoint operation, the end of the system log on disk is noted before the database image is checkpointed, thereby becoming a "begin-recovery-point" for this checkpoint once the checkpoint has completed. Updates described by log records preceding this point have suitably been checkpointed to database image. Restart recovery therefore applies redo log records following the begin-recovery-point for the last completed checkpoint of the database.

Once the redo log records have been applied, the active transactions are rolled back. Completed operations that have been invoked directly by the transaction, or have been directly invoked by an incomplete operation are rolled back. However, the order in which operations of different transactions are rolled back is important, so that an undo at level Li is associated with data structures that are consistent. First, operations (across transactions) at Lo are rolled back rolled back, followed by operations at L1, then L2 and so on. The phrase "associated with" and derivatives thereof, as used herein, may mean to include within, interconnect with, contain, be contained within, connect to or with, couple to or with, be communicable with, juxtapose, cooperate with, interleave, be a property of, be bound to or with, have, have a property of, or the like.

Note that for certain uncommitted updates present in the redo log, undo log records may not have been recorded during the checkpoint—this may happen for instance when an operation executes and commits after the checkpoint, and the containing transaction has not committed. The undo description for the operation may be suitably found in operation commit log records during the forward pass over the global system log earlier during recovery. Any redo log records for updates performed by an operation whose commit log record is not found in the system log are ignored (since these must be due to a crash during flush and are at the tail of the system log).

It should be noted that some types of operations that a transaction may need to execute cannot be rolled back. For example, consider deletion of a record from the database when physical pointers are employed. If the space for the record were de-allocated as part of the delete, then problems may be encountered during rollback if the transaction were to abort. The reason for this is that, for high concurrency, storage allocation and de-allocation is permitted to continue once the space for the record is de-allocated but before the transaction (or operation) that de-allocated the space has been committed. As a result, the space may potentially be allocated by another transaction, making it impossible for the transaction that freed it to re-obtain it in case it were to abort. New storage space may need to be allocated for the record and old references/pointers to the record (e.g., in the hash index) may no longer be valid.

According to the '542 Application, this problem may be suitably avoided using post commit operations, that is operations that are carried out after transaction or operation commit, even in the face of system/process failure. Transaction operations that cannot be undone can be performed as post-commit operations, preserving the all-or-nothing property of the transaction. By executing the de-allocation of storage space for the record as a post-commit operation, high concurrency is permitted on the storage allocator (transaction duration locks on the allocator may not be required), and at the same time, ensure that space gets de-allocated if the transaction commits, whether or not the system fails after the commit. This is also valuable for implementing externally visible writes, such as sending a message on commit of a transaction, which is often important work-flow situations. Similarly, the notion of post-commit operations may be suitably extended to operations by permitting an operation at level Li to require post-commit operations at level Li–1 to be executed once it pre-commits.

A separate post-commit log may be suitably maintained for each transaction—every log record contains the description of a post-commit operation to be executed—and appended to the system log before the commit record for a transaction (when it pre-commits) or immediately prior to the operations commit record when the operation pre-commits. Once transaction commit/operation pre-commit completes the post-commit operations are executed. Note that, for every committed transaction, post-commit log records for the transaction may be contained on disk, in the log, and possibly also in the checkpointed active transaction table (in cases where post-commit log records in the log are before the begin-recovery point). As a result, during restart recovery, for transactions that were in the process of executing post-commit operations when the system crashed, the post-commit operations mat be suitably determined and executed.

Figure 1:
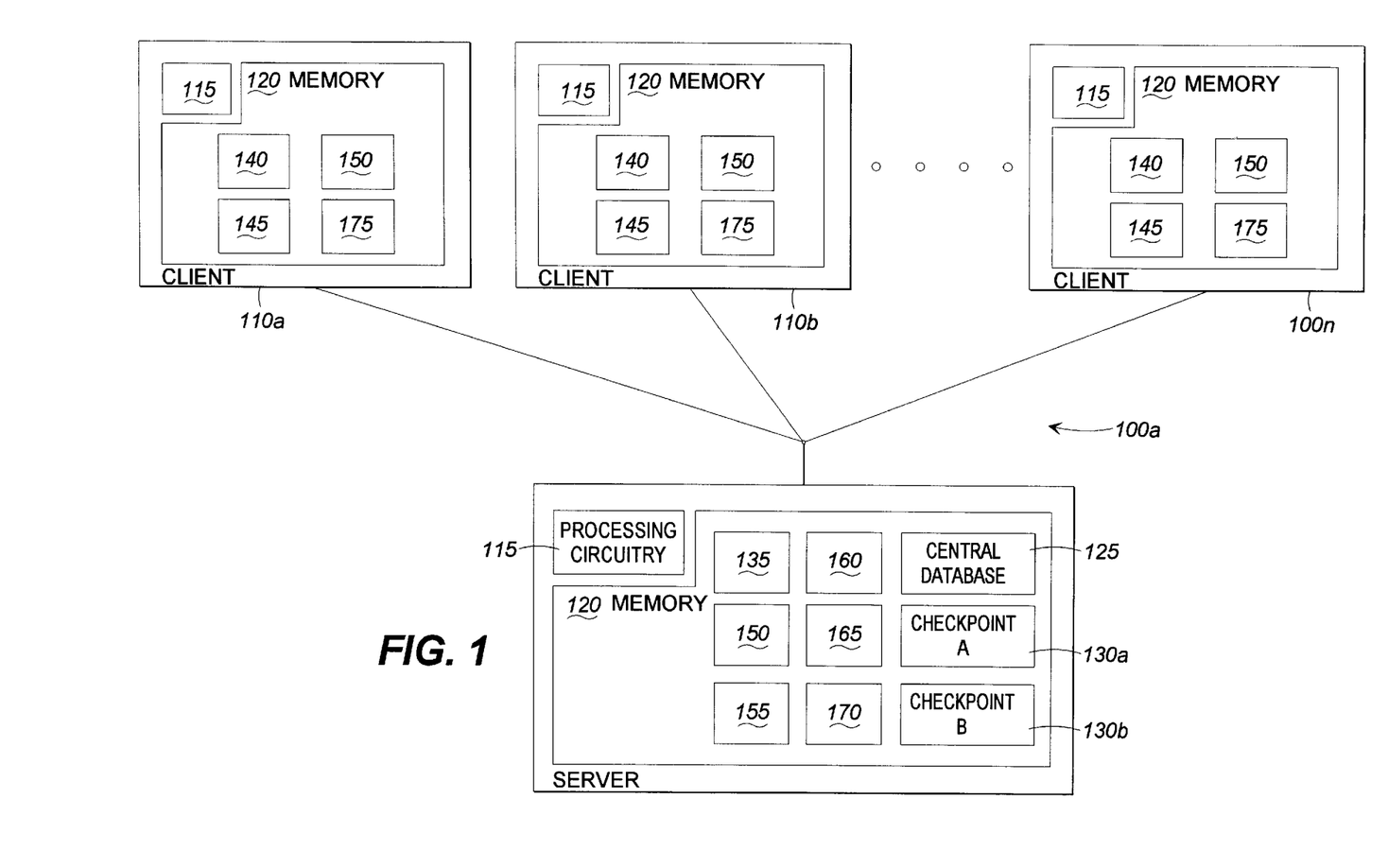
FIG. 1 illustrates a block diagram of an exemplary computer network that provides an environment within which the principles of the present invention may be implemented and operated.

Turning initially to FIG. 1, illustrated is a block diagram of an exemplary computer network (generally designated 100a) that provides an environment within which the principles of the present invention may be implemented and operated. Exemplary network 100a illustratively includes a single server 105 that is suitably associated with a plurality of clients 110. Those skilled in the art will understand that illustrated embodiment may include any suitable number of servers 105 and clients 110, and that each server 105 and each client 110 may itself be a computer network. For these and other reasons set forth herein, FIG. 1 is illustrative only. More over, the principles of the present invention are usable in processing environments other than computer networks, such as data communication (e.g., wired and wireless public and private communication networks) and multimedia networks.

Server 105 illustratively includes processing circuitry 115 and a memory 120. Exemplary memory 120 advantageously includes volatile and non-volatile portions, and collectively-illustratively includes a central database 125, two checkpoints 130a, 130b, a stable log 135, active transaction table 150, a dirty page table 155, a checkpoint determination controller 160, an operation application controller 165 and a global lock manager ("GLM") 170. Exemplary central database 125 uses multiple checkpoints 130a, 130b and stable log 135 for tracking operations on central database 125 to allow corresponding operations to be made to the multiple checkpoints 130a, 130b.

Each of clients 110 also illustratively includes a processor 115 and a memory 120, the memory of client 110 including volatile memory. Exemplary memory 120 illustrative includes a distributed counterpart (a copy) 140 of central database 125, a tail 145 (associated with stable log 135), active transaction table 150 and a local lock manager ("LLM") 175. Exemplary distributed counterparts 140 allow operations to be performed locally thereon by respective clients 110.

The present invention introduces the broad concept of providing a distributed database that may be revised quickly (because it is stored in the separate volatile memories of the various computer systems of a computer network), but that is recoverable should it (or any of the distributed counterparts) become corrupted (by virtue of being stored in the volatile memories). According to the illustrated embodiment, stable log 135 and associated log tails 145 cooperate to track operations on corresponding ones of distributed counterparts 140 (which is subject to corruption).

Server 105 is responsible for coordinating logging, as well as performing checkpoints and recovery according to the principles of the present invention (local logging, checkpointing and recovery may suitably be performed according to the principles of the '542 Application). As transactions execute at ones of the client 110 and, hence, revisions are made to distributed counterparts 140 of database 125 at clients 110, at least a portion of distributed counterparts 140 of database 125 at other clients 110 are likely no longer current.

According to the illustrated embodiment, state information may be suitably maintained at each client 110 about each distributed counterpart 140 page (and hence central database 125 page)—each distributed counterpart 140 at a particular client 110 may be one of valid or invalid. Invalid pages contain stale versions of certain of the data of central database 125, and that may be suitably refreshed by obtaining a latest (current) copy of the subject page from server 105.

According to the illustrated client-server embodiment, log records for updates generated by a transaction (one or more associated operations) at a particular client 110b are advantageously stored in active transaction table 150 (according to the principles of the '542 Application). Client 110b does not maintain a stable log locally, rather it maintains local log tail 145 to which it appends log records from the local redo logs as operations commit/abort.

In an advantageous embodiment, stable log 135 and each of log tails 145 cooperate to form a global log reflective of transactions (operations) performed on central database 125.

Figure 2:
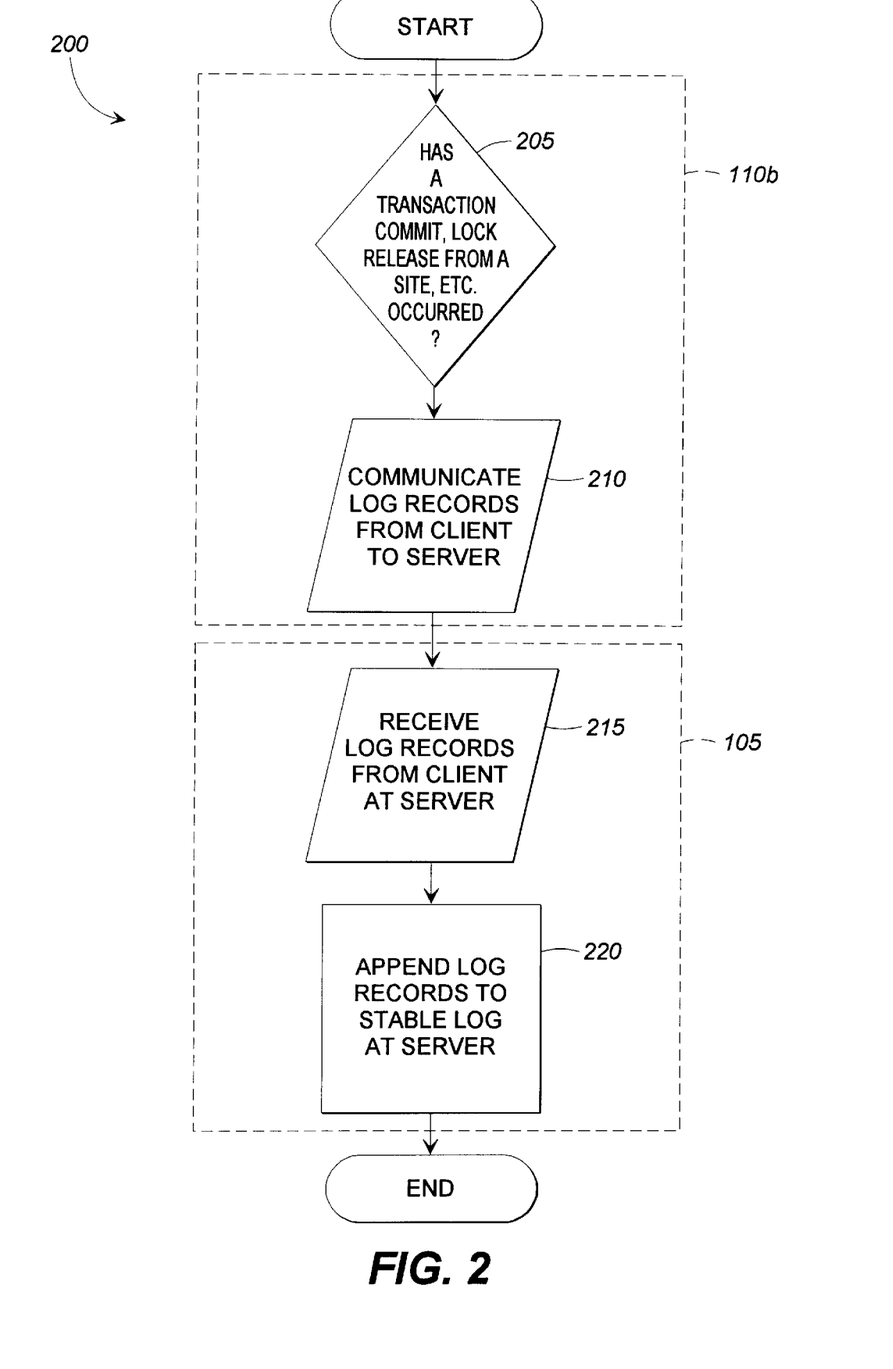
FIG. 2 illustrates a flow diagram of an exemplary method for communicating log records in a local log tail of a to a stable log of a server.

Turning momentarily to FIG. 2, illustrated is a flow diagram of an exemplary method (generally designated 200) for communicating log records in local log tail 145 of client 110b to stable log 135 of server 105. Client 110b advantageously appends redo log records to its log tail 145 and commit log records to the transaction undo log associated with active transaction table 150, as described hereinabove and according to the '542 Application. Upon the occurrence of certain events (e.g., transaction commit, lock release from a client site (described hereinafter), etc.) (YES branch of decisional step 205), log records in log tail 145 are communicated by client 110b to server 105 (input/output step 210). Further action concerning affected portions (regions) of pages is delayed until server 105 acknowledges that the communicated log records have been flushed to disk.

In an effort to maximize network communication bandwidth, full pages (updates) are advantageously communicated only from server 105 to clients 110.

Log records received from client 110b are appended to stable log 135 (process step 220) and are used to update server 105's copy of the affected pages (ensuring that pages shipped to clients 110 from server 105 are current). This aspect of the present embodiment supports concurrent updates to a single page at multiple clients 110 since re-applying the updates at server 105 causes them to be merged.

For each physical redo log record (received from client 110b), an undo log record is generated by reading the current contents of the page at server 105 and appending the same to the undo log for this transaction in active transaction table 150 of server 105. The update described by the redo log record is applied, the log record is appended to the redo log for the transaction in active transaction table 150 of server 105. Operation/transaction begin, commit and abort log records received from client 110 are processed as described hereinabove and according to the '542 Application. Three notable exceptions include lock release (driven by client 110), operation commit (logical undo descriptor is extracted from the commit log record), and transaction commit (client 110 is notified after the log flush to disk succeeds).

By applying all the physical updates described in the physical log records to its pages, server 105 ensures that contains the latest updates on regions for locks which have been released to it from clients 105. The effect of the logging scheme, as far as data updates are concerned, is just as if a client 110 transaction (operation) actually processed at server 105.

Returning to FIG. 1, shipment of log records is typically cheaper than page shipment, and the cost of applying the log records themselves is relatively small as server 105 will not have to read the affected pages from disk (exemplary central database 125 is advantageously main (volatile) memory resident according to the '542 Application).

Server 105 associates a log sequence number ("LSN"), with each log record, the reflects the order in which a particular record was applied to server 105's copy of a particular page and the order in which the particular record was appended to stable log 135. Advantageously, checkpointing is performed solely at the server according to the '542 Application.

Advantageously, execution of transactions (one or more associated operations) use a callback locking methodology to obtain and release locks. Callback locking methodologies are known. Each LLM 175 operates to cache locks and GLM 170 operates to track locks cached at various ones of clients 110. Transaction (operation) requests for locks cached locally may be suitably handled locally at a particular client 110. However, transaction (operation) requests for a particular lock not cached locally by a particular client 110b may be suitably forwarded to GLM 170 which operates to call back the particular lock from other clients 110 that may have cached the particular lock in a conflicting mode (e.g., before granting the lock request)—a specific client 110n may suitably relinquish the particular lock in response to the callback if no transaction (operation) executing at the specific client 110n is currently holding the lock. It should be noted that each LLM 175 provides support for associating a point in log tail 145 with each lock, the purpose of which is discussed in greater detail hereinbelow.

Except as specified below, actions performed at server 105 and clients 110 concerning processing and interaction respectively with central database 125 and distributed counterpart 140 may be substantially the same as those described hereinabove, and more specifically according to the '542 Application.

Figure 3:
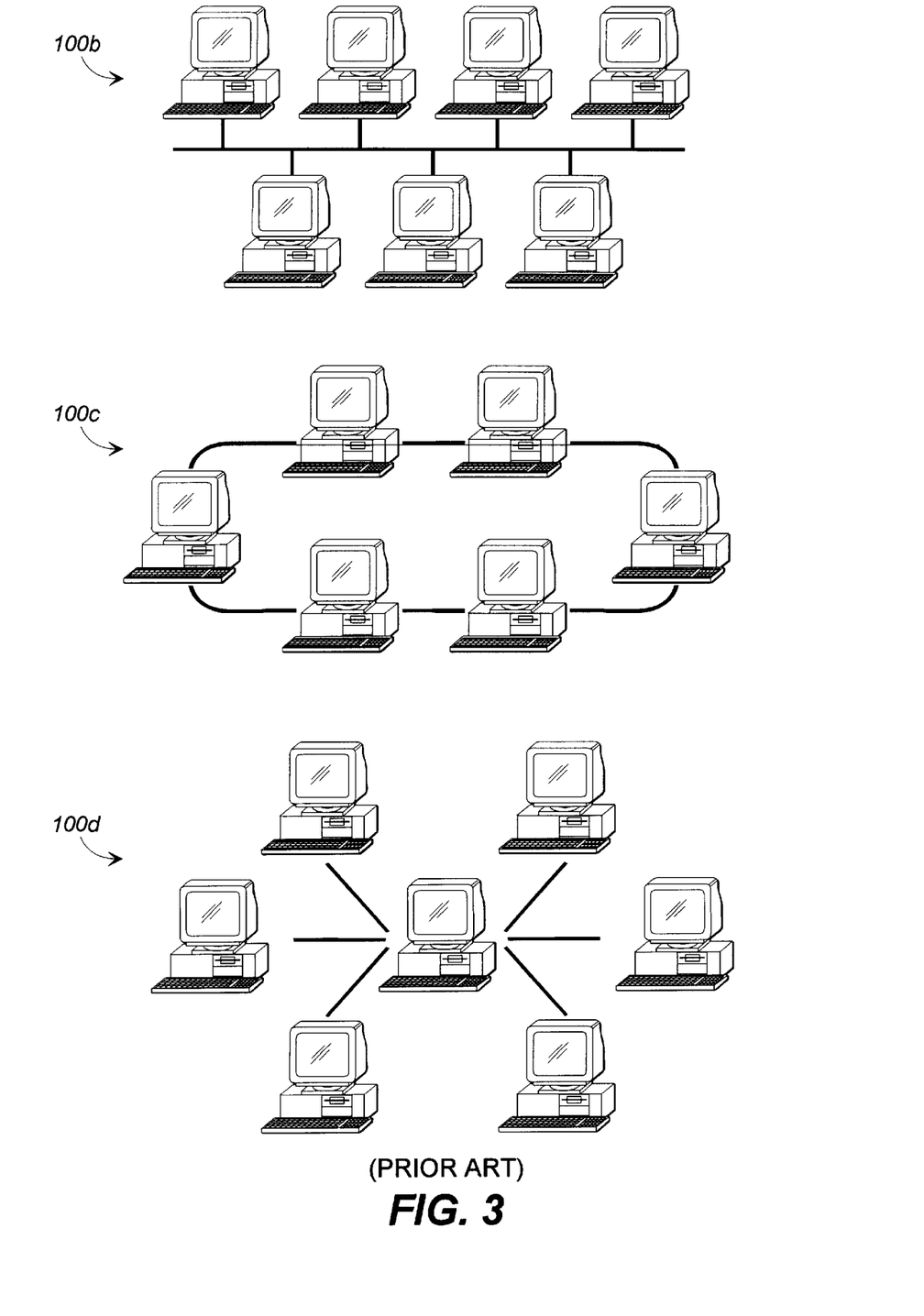
FIG. 3 illustrates block diagrams of three exemplary computer network topologies, each of which may provide a suitable alternate environment to the exemplary computer network of FIG. 1 within which the principles of the present invention may be suitably implemented and operated.

Turning momentarily to FIG. 3, illustrated are block diagrams of three exemplary computer network topologies 100b, 100c and 100d, each of which may provide a suitable alternate environment to exemplary computer network 100 within which the principles of the present invention may be suitably implemented and operated. Exemplary network 100b is a conventional bus topology; Exemplary network 100c is a conventional ring topology; and Exemplary network 100d is a conventional star topology, all of which are well known in the art. FIG. 3, like FIG. 1, is illustrative only as alternate network topologies are also known in the art. The term "computer" and the phrases "computer system" and "computer network," as used herein, are broadly defined and include all types of associable computers (e.g., micro, notebook, personal, mini, main frame, super and like computers) and computer networks, as well as communication and multimedia networks.

Conventional computer system architecture is more fully discussed in *The Indispensable PC Hardware Book*, by Hans-Peter Messmer, Addison Wesley (2nd ed. 1995) and *Computer Organization and Architecture*, by William Stallings, MacMillan Publishing Co. (3rd ed. 1993); conventional computer, or communications, network design is more fully discussed in *Data Network Design*, by Darren L. Spohn, McGraw-Hill, Inc. (1993); and conventional data communications is more fully discussed in *Voice and Data Communications Handbook*, by Bud Bates and Donald Gregory, McGraw-Hill, Inc. (1996), *Data Communications*

*Principles*, by R. D. Gitlin, J. F. Hayes and S. B. Weinstein, Plenum Press (1992) and *The Irwin Handbook of Telecommunications*, by James Harry Green, Irwin Professional Publishing (2nd ed. 1992). Each of the foregoing publications is incorporated herein by reference for all purposes.

Returning to FIG. 1, there are two advantageous approaches for maintaining true (correct) page state information that are discussed in detail with reference to FIGS. 4 and 5. According to both approaches, a plurality of clients 110 may be suitably permitted to concurrently update a particular (same) page, advantageously using different locks for different regions of the particular page. Region locking insures data integrity and helps facilitate distributed counterpart recovery according to the principles of the present invetion. Before undertaking descriptions of FIGS. 5 and 6 it is advantageous to delineate process steps common to both approaches.

First, concerning database page access, if a particular client 110*b* wishes to accesses a particular page that is valid (unmodified, coherent, timed-out, etc.), client 110*b* advantageously accesses the page without communicating with server 105. If the particular page is invalid (indicating that certain data on the page may be stale), then client 110*b* advantageously refreshes the page by obtaining a most recent version of the page from server 105, applying to the received page any local updates which have not yet been sent to server 105 (this step may suitably merge local updates with updates received from other sites), and marking the received page as valid. In an advantageous embodiment, server 105 tracks which clients 110 have which pages in a valid state.

Second, concerning lock release, for each region lock and operation lock that is acquired and then released by a transaction (operation), server 105 notes and stored each particular client 110's log tail 145 with the lock. For any region lock, all redo log records in log tail 145 affecting that region precede the point in log tail 145 stored with the lock. Similarly, for any operation lock, all log records relating to the operation (including operation commit) precede the point in the log tail 145 stored with the lock. This location in log tail 175 is client 110-specific, and not related to the LSN generated by server 105.

Advantageously, before any client 110 releases (relinquishes) a region or operation lock to server 105 due to the call-back described hereinabove, client 110 communicates at least the portion of log tail 175 that precedes the log pointer stored with the lock to server 105, thereby ensuring that a "next" lock will not be acquired on the region until server 105's copy of the same is suitably updated (and the history of the update is stored in server 105's logs). For region locks, this flush ensures repeating of history on regions, while for operation locks this flush ensures that server 105 receives relevant logical undo descriptors from the operation commit log records for the operation which released the locks. Thus, if server 105 aborts a transaction (operation) after some client 110 failure, the abort will take place at the logical level with locks still held for it at server 105.

Lastly, concerning transaction (operation) abort/client 110 failures, (1) if some client 110 decides to abort a transaction (one or more operations), client 110 processes the abort as set forth hereinabove and according to the '542 Application using the undo logs for the transaction in active transaction table 150 of client 110; (2) if some client 110 fails (becomes corrupted), server 105 aborts transactions that were active at client 110 using undo logs for the transaction in active transaction table 150 of server 105; and (3) if server 105 fails, then computer network 100 is brought down, and restarted recovery is performed at server 105 as described hereinabove and according to the '542 Application.

Figure 4:
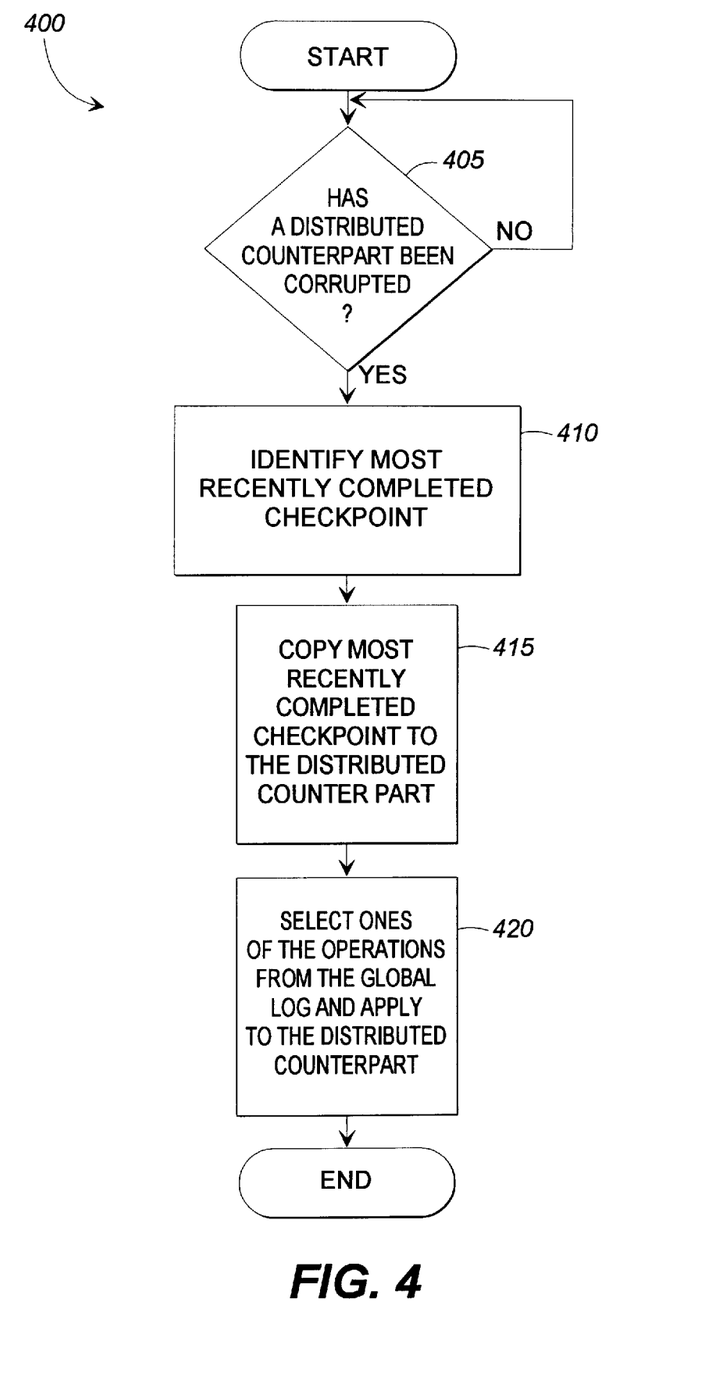
FIG. 4 illustrates a flow diagram of an exemplary method for restoring a distributed counterpart stored in the volatile memory of a client according to the principles of the present invention.

Turning momentarily to FIG. 4, illustrated is a flow diagram of an exemplary method (generally designated 400) for restoring a distributed counterpart 140 stored in the volatile memory 120 of a client 110 according to the principles of the present invention. To begin, server 105 determines whether a distributed counterpart 140 has been corrupted (decisional step 405) and, in response thereto (YES branch of decisional step 405), directs checkpoint determination controller 160 to determine which of multiple checkpoints 130*a*, 130*b* is a most recently completed checkpoint (process step 410). Exemplary checkpoint determination controller 160 copies the most recently completed checkpoint to the volatile memory of corrupted distributed counterpart 140 to serve as an unrevised database for reconstructing distributed counterpart 140 (process step 415). Exemplary operation application controller 165 then retrieves selected ones of the operations from stable log 135 and log tail 145 corresponding to distributed counterpart 140 and applies the operations to the unrevised database thereby to restore distributed counterpart 140 (process step 420). The illustrated embodiment employs multiple checkpoints 130*a*, 130*b* and stable log 135 (having a volatile tail 145) to accomplish the heretofore inconsistent characteristics of quick revision and reliable recoverability in a distributed main-memory database.

According to an advantageous embodiment, checkpoint determination controller 160 also copies active transaction table 150 from the most recently completed checkpoint 130*a*, 130*b* to the volatile memory to distributed counterpart 140. Active transaction table 150 operates to define the state of transactions (correlating to operations) that are to be made, are in the process of being made or have been made to central database 125 and distributed counterparts 140. The active transaction table provides a guide to operation application controller 165 as to how to reconstruct distributed counterpart 140 to an uncorrupted state. In a related embodiment, operation application controller 165 applies revisions as a function of temporal pointers associated with each client 110 and the global log (central log 135 and log tails 145). The temporal pointers collectively provides a high-resolution indication of which of revisions to central database 125 have been applied to the unrevised database. Operation application controller 165 retrieves revisions from stable log 135 and ones of log tails 145 that have not made to the most recently completed checkpoint 130*a*, 130*b*.

Returning to FIG. 1, the illustrated embodiment suitably uses one of two approaches ("invalidate-on-update" and "invalidate-on-lock") to ensure that client 110 accessed data is true (up to date). The actions described hereinabove may be suitably common to both schemes, and both schemes follow the rule that all log records are flushed to server 105 before a lock associated with a particular set of updates is released. Since server 105 will apply the log records to its copy of the data, this ensures that when server 110 grants a lock, it has the current version of all pages containing data covered by that lock. However, it is possible that the copy of one or more pages involved in the region for which the lock was obtained are not true at client 110. Each scheme, by invalidating pages at client 110, ensures that clients 110 do not access stale data. Each exemplary approach advantageously spans multiple pages and does not require the pages spanned by a region to be known.

Figure 5:
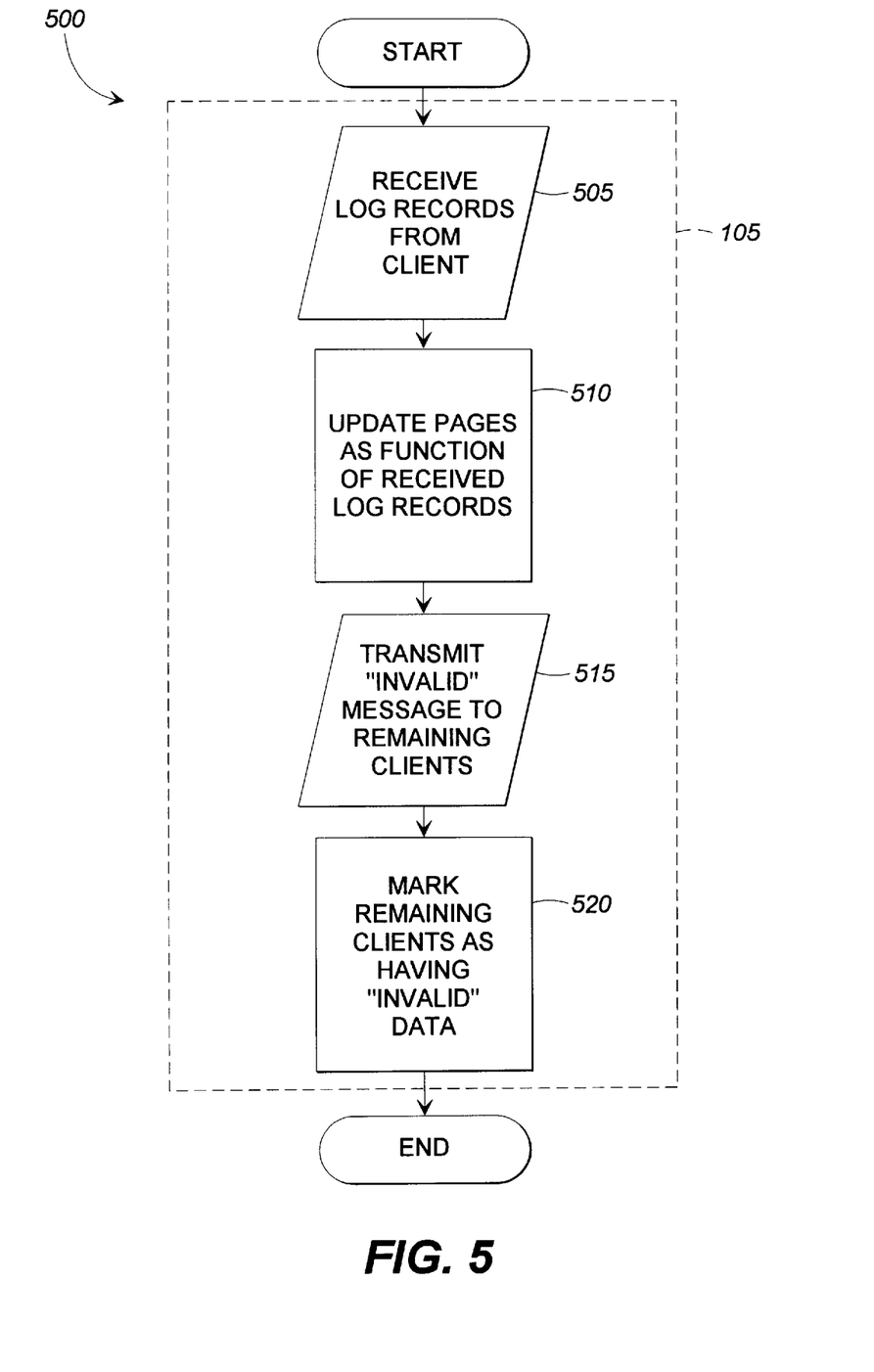
FIG. 5 illustrates a flow diagram of an exemplary method for invalidating pages upon update according to an advantageous embodiment of the present invention.

Turning now to FIG. 5, illustrated is a flow diagram of an exemplary method (generally designated 500) for invalidating pages upon update according to an advantageous embodiment of the present invention. The present embodiment is based on updates—a page at client 110 is invalidated whenever any update is made to the page at server 105.

To begin, server 105 receives log records from a particular client 110a (input/output step 505). Server 105 updates one or more pages in database 125 as a function of the received logs (process step (510). Server 105 transmits, as function of the one or more updated pages, an "invalid" message to clients 110 (advantageously other than client 110a) that may have the page marked as valid (input/output step 515). Server 105 marks, for all clients 110 other than client 110a, clients 110 as having the page marked invalid (process step 520). Clients 110, in response to receiving the invalid message, mark the page as invalid.

For example, consider two clients 110a, 110n update the same page concurrently under two different region locks. Whichever client 110a, 110n flushes its update to server 105 first will cause server 105 to send an invalid message to the other clients 110, causing, in part, the second clients 110a, 110n to flush its update to re-read the page from server 105.

Figure 6:
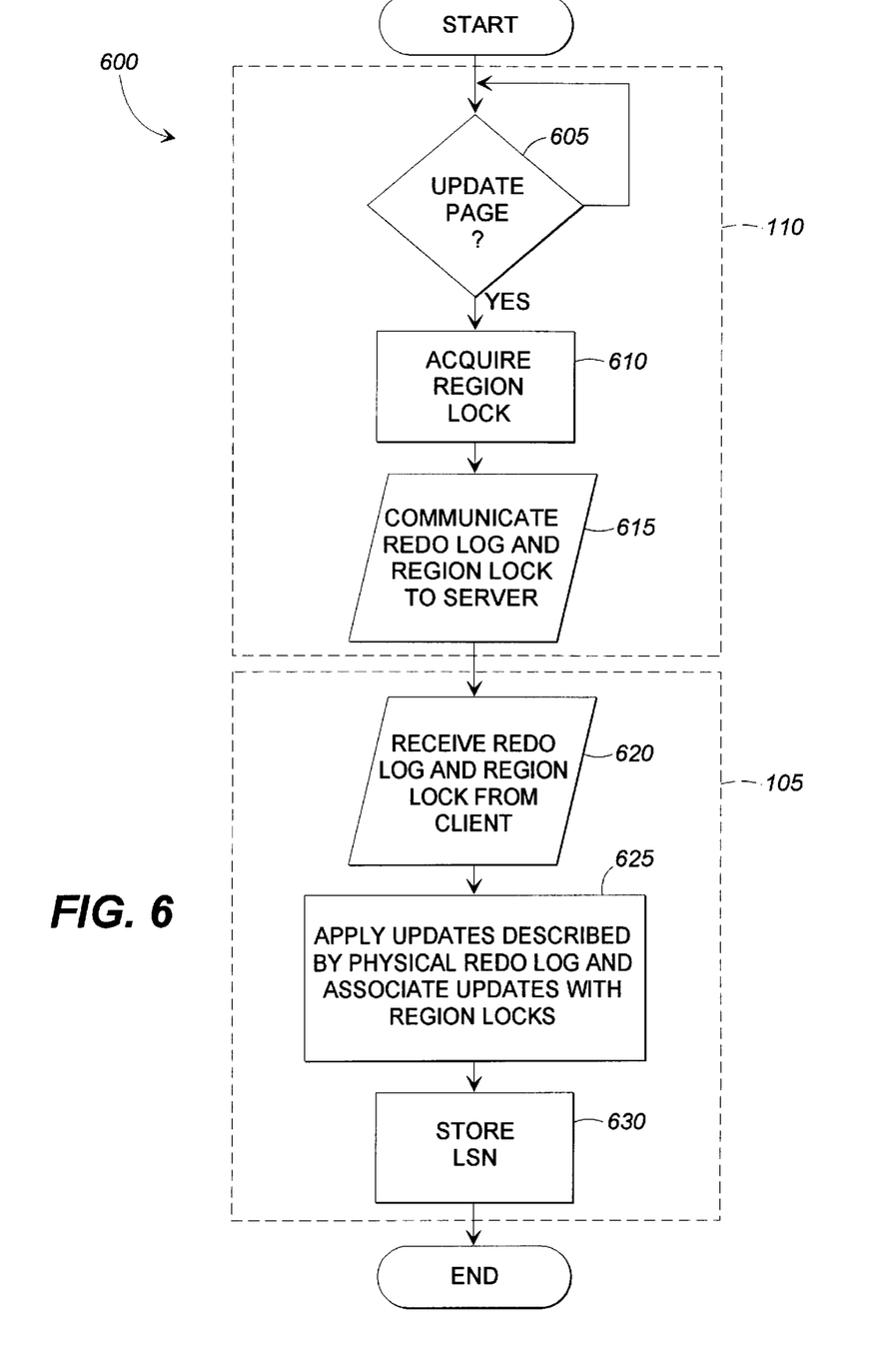
FIG. 6 illustrates a flow diagram of an exemplary method for invalidating pages upon lock according to an advantageous embodiment of the present invention.

Turning now to FIG. 6, illustrated is a flow diagram of an exemplary method (generally designated 600) for invalidating pages upon lock according to an advantageous embodiment of the present invention. The present embodiment is based on locks—reducing the number of invalidation messages of the previous approach by tracking "per-lock" information at server 105 thereby reducing the overhead of sending invalidation messages by associating information about updates to a region with the lock for the region. Pages containing updated portions of a region are invalidated only when the lock on the region is obtained by client 110. As a result, if two clients 110 are updating different regions on a same page, no invalidation messages are sent to either client 110. Additionally, by piggybacking invalidation messages for updated pages on lock grant messages from server 105, the overhead of sending separate invalidation messages in the previous approach is substantially reduced.

To begin, a client 110n determines whether a page is to be updated in response to a transaction (operation) (decisional step 605). If the page is to be updated (YES branch of decisional step 605), then a region lock is acquired from server 105 for a region of the page subject to the update and the region lock is associated with a redo record for the update (process step 610). In an advantageous embodiment, this may be suitably achieved by requiring the region lock for be specified by the client when the region is updated—this is easily implemented since all updates must be made holding region locks. The region lock name may be suitably associated with the redo log record.

According to an advantageous embodiment, a set of invalidate messages is passed back to client 110n with the lock acquisition. The invalidate messages are for pages in the list associated with the lock being acquired that meet three criteria:

1. the page is cached at client 110n in a valid state;
2. the LSN of the page in a client page table ("cpt") of server 105 for client 110n is smaller than the LSN for the page in the lock list; and
3. client 110n acquiring the lock was not the last to update the page under this lock.

The invalidated pages are marked invalid in the cpt for client 110a and at the client site.

Client 110n communicates the redo log record with the associated region lock name to server 105 (input/output step 615). Server 105 receives the redo log record with the associated region lock name from client 110n (input/output step 620), and applying updates described by a physical redo record to pages at server 105 and associating the updated pages with the region lock for the updated region (process step 625).

Advantageously, for each page, server 105 stores the LSN of the most recent log record that updated the page, and the identity of client 110n that issued the same (process step 630).

For each client 110, server 105 advantageously maintains (1) a state of the page at client 110n ("valid" or "invalid") and (2) the LSN for the page when it was last shipped to client 110, all in a cpt. Server 105 also advantageously maintains for each region lock a list of pages that are dirty due to updates to the region.

Thus, for each page in the list, the LSN of the most recent log record received by server 105 that recorded the update to data in the part of the region on this page is stored, a long with client 110n which performed the update. Thus, when client 110n is granted a region lock, if, for a page in the lock list, the LSN is greater than the LSN for the page when it was last shipped to client 110n, then client 110n's page contains stale data for the region and must be invalidated.

According to an advantageous embodiment, when server 105 applies to a page, P, a redo log record, LR, generated at client 110n under region lock, L, server 105 sets the LSN for P to the LSN for LR and the entry for the same in the list of dirty pages for L is updated (or created), setting client to client 110n and LSN to the LSN for LR.

It should be noted that, as above, when server 105 sends a page to a client 110 (page refresh), at server 105, the page is marked valid in the cpt for client 110 and the LSN for the page in the cpt is updated to be the LSN for the page at server 105. In a related embodiment, server 105 attempts to keep the list of pages with locks as small as possible by periodically deleting pages P from the list of the L such that the following condition holds, where client 110 is client 110n noted in the list of pages for L as the last client 110 to update P (Every client 110 other than 110n has the page cached either in an invalid state or with LSN greater than or equal to the LSN for the page in the list for lock L). The rationale for this rule is that the purpose of region locks lists is to determine pages that must be invalidated. However, if for a page in client 110's cpt, the LSN is greater than the LSN for the page in the lock list, then client 110 has the most recent update to the region on the page, and thus the page will not need to be sent in any invalidate list.

From the above, it is apparent that the present invention provides, for use with a central database associated with a server of a computer network, the central database having distributed counterparts stored in volatile memories of clients of the computer network to allow operations to be performed locally thereon, the central database further having multiple checkpoints and a stable log stored in the server for tracking operations on the central database to allow corresponding operations to be made to the multiple checkpoints, the stable log having tails stored in the volatile memories to track operations on corresponding ones of the distributed counterparts, the distributed counterparts subject to corruption, a system for, and method of, restoring a distributed counterpart stored in one of the volatile memories. The system includes: (1) a checkpoint determination controller that determines which of the multiple checkpoints is a most recently completed checkpoint and copies the most recently completed checkpoint to the one of the volatile memories to serve as an unrevised database for reconstructing the distributed counterpart and (2) an operation application controller that retrieves selected ones of the operations from the stable log and a tail corresponding to the distributed counterpart and applies the operations to the unrevised database thereby to restore the distributed counterpart. "Include" and derivatives thereof, as used herein, means inclusion without limitation, and "controller," as used herein, may be suitably hardware-, firmware- or software-based, or may include suitable combinations of the same.

Although the present invention has been described in detail, those skilled in the art should understand that they can make various changes, substitutions and alterations herein without departing from the spirit and scope of the invention in its broadest form.

What is claimed is:

1. For use with a central database associated with a server of a network, said central database for operation with at least one distributed counterpart stored in a volatile memory of at least one respective client of said network to allow operations to be performed locally thereon, said central database further having multiple checkpoints and a stable log stored in said server for tracking operations on said central database to allow corresponding operations to be made to said multiple checkpoints, said stable log having a tail stored in said volatile memory to track operations on said distributed counterpart, said distributed counterpart subject to corruption, a system for restoring said distributed counterpart stored in said volatile memory, comprising:

a checkpoint determination controller that determines which of said multiple checkpoints is a most recently completed checkpoint and copies said most recently completed checkpoint to said volatile memory to serve as an unrevised database for reconstructing said distributed counterpart; and an operation application controller that retrieves selected ones of said operations from said stable log and said tail corresponding to said distributed counterpart and applies said operations to said unrevised database thereby to restore said distributed counterpart.

2. The system as recited in claim 1 wherein said applied operations include log records at an operation level, and said operation application controller, using memory locks while restoring said distributed counterpart, releases ones of said memory locks as a function of applying ones of said log records.

3. The system as recited in claim 1 wherein log records, having been communicated by said client, are received at said server.

4. The system as recited in claim 1 wherein said client requests a region lock from said server.

5. The system as recited in claim 1 wherein said server grants a region lock to said client.

6. The system as recited in claim 1 wherein said server communicates validity information to said client concerning said distributed counterparts.

7. The system as recited in claim 1 wherein said multiple checkpoints are checkpointed alternately.

8. The system as recited in claim 1 wherein said central database and said multiple checkpoints each contain an active transaction table, said checkpoint determination controller copying said active transaction table from said most recently completed checkpoint to said volatile memory.

9. The system as recited in claim 1 wherein said stable log and said tail cooperate to form a global log, said operation application controller applying said operations as a function of a temporal pointer associated with said global log.

10. The system as recited in claim 1 wherein said operation application controller retrieves operations from said stable log and said tail corresponding to said distributed counterpart that were not made to said most recently completed checkpoint.

11. The system as recited in claim 1 wherein said multiple checkpoints and said stable log are stored on a nonvolatile storage device.

12. The system as recited in claim 1 wherein said central database further has an undo log for tracking operations to be undone in said distributed counterpart, said operation application controller retrieving said selected ones of said operations as a function of a content of said undo log.

13. For use with a central database associated with a server of a network, said central database for operation with at least one distributed counterpart stored in a volatile memory of at least one respective client of said network to allow operations to be performed locally thereon, said central database further having multiple checkpoints and a stable log stored in said server for tracking operations on said central database to allow corresponding operations to be made to said multiple checkpoints, said stable log having a tail stored in said volatile memory to track operations on said distributed counterpart, said distributed counterpart subject to corruption, a method of restoring said distributed counterpart stored in said volatile memory comprising the steps of:

determining which of said multiple checkpoints is a most recently completed checkpoint;

copying said most recently completed checkpoint to said volatile memory to serve as an unrevised database for reconstructing said distributed counterpart;

retrieving selected ones of said operations from said stable log and a tail corresponding to said distributed counterpart; and applying said operations to said unrevised database thereby to restore said distributed counterpart.

14. The method as recited in claim 13 wherein said applied revisions include log records, said method further including the steps of:

using memory locks while restoring said distributed counterpart, and releasing ones of said memory locks as a function of applying ones of said log records.

15. The method as recited in claim 13 further including the step of receiving log records communicated from said client at said server.

16. The method as recited in claim 13 further including the step of requesting a region lock from said server by said client.

17. The method as recited in claim 13 further including the step of granting a region lock to said client by said server.

18. The method as recited in claim 13 further including the step of communicating validity information from said server to said client concerning said distributed counterpart.

19. The method as recited in claim 13 wherein said multiple checkpoints are checkpointed alternately.

20. The method as recited in claim 13 wherein said central database and said multiple checkpoints each contain an active transaction table, said method further comprising the step of copying said active transaction table from said most recently completed checkpoint to said volatile memory.

21. The method as recited in claim 13 wherein said stable log and said tail cooperate to form a global log, said step of applying comprising the step of applying said operations as a function of a temporal pointer associated with said global log.

22. The method as recited in claim 13 wherein said step of retrieving comprises the step of retrieving operations from said stable log and said tail corresponding to said distributed counterpart that were not made to said most recently completed checkpoint.

23. The method as recited in claim 13 wherein said multiple checkpoints and said stable log are stored on a nonvolatile storage device.

24. The method as recited in claim 13 wherein said central database further has an undo log for tracking operations to be undone in said distributed counterpart, said step of retrieving comprising the step of retrieving said selected ones of said operations as a function of a content of said undo log.

25. A network, comprising:

a server having a volatile memory that contains a central database therein;

at least one client associated with said server, said client having a volatile memory that contains a distributed counterpart of said central database to allow said distributed counterpart to be directly revised, said distributed counterpart subject to corruption;

at least one nonvolatile storage unit, coupled to said server, that contains multiple alternative checkpoints of said central database and a stable log, having a tail stored in said volatile memory of said client, for tracking operations to said distributed counterpart to allow corresponding operations to be made to said multiple alternative checkpoints; and a processor, associated with said network, that executes routines for revising said central database and distributed counterpart and for restoring said distributed counterpart if said distributed counterpart is corrupted, said routines for restoring said distributed counterpart including:

a checkpoint determination controller that determines which of said multiple checkpoints is a most recently completed checkpoint and copies said most recently completed checkpoint to said volatile memory to serve as an unrevised database for reconstructing said distributed counterpart, and an operation application controller that retrieves selected ones of said operations from said stable log and said tail corresponding to said distributed counterpart and applies said operations to said unrevised database thereby to restore said distributed counterpart.

26. The network as recited in claim 25 wherein said applied operations include log records, and said operation application controller, using memory locks while restoring said distributed counterpart, releases ones of said memory locks as a function of applying ones of said log records.

27. The network as recited in claim 25 wherein log records, having been communicated by said client, are received at said server.

28. The network as recited in claim 25 wherein said client requests a region lock from said server.

29. The network as recited in claim 25 wherein said server grants a region lock to said client.

30. The network as recited in claim 25 wherein said server communicates validity information to said client concerning said distributed counterpart.

31. The network as recited in claim 25 wherein said multiple checkpoints are checkpointed alternately.

32. The network as recited in claim 25 wherein said central database and said multiple checkpoints each contain an active transaction table, said checkpoint determination controller copying said active transaction table from said most recently completed checkpoint to said volatile memory.

33. The network as recited in claim 25 wherein said stable log and said tail cooperate to form a global log, said operation application controller applying said operations as a function of a temporal pointer associated with said global log.

34. The network as recited in claim 25 wherein said operation application controller retrieves operations from said stable log and said tail corresponding to said distributed counterpart that were not made to said most recently completed checkpoint.

35. The network as recited in claim 25 wherein said central database further has an undo log for tracking operations to be undone in said distributed counterpart, said operation application controller retrieving said selected ones of said operations as a function of a content of said undo log.

* * * * *